Patented Jan. 19, 1954

2,666,912

UNITED STATES PATENT OFFICE 2,666,912

ELECTRICAL COUNTER

Kenneth P. Gow, Pasadena, and Arthur L. Klein, Los Angeles, Calif., assignors to California Institute Research Foundation, Pasadena, Calif., a corporation of California Application May 16, 1950, Serial No. 162,305

6 Claims. (Cl. 340—345)

This invention relates to an electrical counter for digitally translating the angular rotation of shafts into electrical impulses which can be used to control various types of indicating devices such as banks of illuminated numerals, punch card machines or the like.

Devices for accurately and rapidly indicating and recording the angular position of rotating shafts, dials or pointers have a wide variety of applications. For example, many types of apparatus employed in experimentation utilize shaft rotation, driving dials or pointers to indicate the data sought to be obtained. Also, various commercial devices such as calculating and tabulating machines employ rotating shafts to transmit information. In all such devices, it is desirable that means be provided whereby shaft position readings can be taken rapidly and with a high degree of accuracy. It is frequently necessary to take readings from such devices without interrupting their operation. Further, it is frequently desirable to permanently record the data provided by such devices again without interrupting their operation.

In devices used to indicate angular rotation of a shaft in which the shaft is revolving at a relatively high rate of speed it is usually necessary that such device be digitized, that is, that its output count be in terms of whole numbers. Thus, if a visual indicating system is employed, rapid and accurate readings are exceedingly difficult unless the indicator provides a digitized indication. In addition, if the data are to be fed to a numerical tabulating machine or the like it is necessary that such data be digitized. Several mechanical counters for indicating the amount of rotation of a shaft in whole numbers have heretofore been devised. A familiar example is the common mileage indicator mechanism employed in automobiles. In such devices, the indication is digitized by some physical means such as a snap action detenting or other intermittent motion device which selects the particular whole number to be indicated. Such mechanical devices have proved unsatisfactory for many uses. For example, they tend to wear out rapidly due to impact loads. Further, when such mechanical devices are used in connection with very rapidly rotating shafts they are unsatisfactory because the mechanical parts can tolerate but a limited acceleration. In addition, the torque required to operate such devices varies appreciably, being considerably greater during the detenting operation. This variation in torque not only limits the maximum operating speed but also causes erroneous readings in many applications. Another disadvantage of such mechanical counters lies in the fact that a digitized indication is not always provided inasmuch as they can become stalled as the numbers are changed. Thus, as is well known, an automobile mileage indicator will frequently register between whole numbers when changing decades, such as a change from 99 to 100.

In accordance with the present invention, a translating device or counter is provided which is suitable for very high speed operation, which provides a digitized output without intermittent physical operation with its attendant wear and speed limitation which operates with constant torque regardless of shaft position, thereby avoiding the introduction of errors due to varying torque requirements, and which will not stall between whole numbers during decade changes.

It is frequently desirable that a counter be capable of counting reverse or negative as well as forward or positive shaft rotation. In the conventional type of mechanical counter designed for both positive and negative operation, negative quantities are indicated by employing a second set of indicators. This second set differs from the positive reading indicators in that the counter positions are reidentified so that the indication for plus zero is made minus nine, that for plus one becomes minus eight, etc. The reason for such reidentification is to insure that the physical position at which the units count transfers the tens decade is not changed. While such a system is in general satisfactory, it has one marked disadvantage. The relationship between the positive and negative counters is such that both a plus zero and a minus zero exist, but at different places on the counter. This results in two zero readings as the shaft rotation varies from a plus one to a minus one indication. This double zero introduces a possible error in all readings which either commence at or pass through zero. In accordance with the present invention a counter is provided which will count both positive and negative shaft rotations without requiring a double zero and the possible error resulting therefrom. A counter is provided in which the count or angular position of an input shaft is fed to a suitable indicator by means of a series of relays which are operated by rotating contacts driven by rotating shafts. Tens, hundreds and higher decade counts are provided by rotating contacts geared to the input shaft and relays energized thereby. The specified relays operate to digitize the units count and also to cause the transfer of the tens decade at the proper shaft position. Additional relays associated with the tens decade operate to digitize this decade and also to transfer the next higher, or hundreds decade at the appropriate shaft position. More decades and relays can be added if higher readings are desired. Additional rotating contacts, geared to the highest decade, are utilized to operate a further pair of relays to provide for the appropriate positive or negative count as determined by the rotational position of the input shaft. Accordingly, it is an object of this invention to provide an improved device for digitally counting the angular position of a rotating shaft.

It is a further object of this invention to provide such a device wherein very high speed shaft rotation and high counting rates will not cause mechanical failure of such device.

It is another object of this invention to provide such a device which applies a constant torque to the rotating shaft regardless of the position of such a shaft.

It is an additional object of this invention to provide such a device wherein a digitized output is produced by means of electrical relays rather than an intermittent mechanical motion.

It is still another object of this invention to provide such a device wherein the angular position of the rotating shaft is translated into whole number counts by electrical circuits suitable for providing the input to indicating and recording mechanisms requiring a digital input.

It is still another object of this invention to provide such a device which, although operated by electrical relays, will provide accurate counts following any power interruption.

It is a further object of this invention to provide such a device, the output of which can be fed independently to several indicating or recording mechanisms simultaneously.

It is another object of this invention to provide such a device which, although electrical in operation, is not affected by electrical disturbances.

It is still a further object of this invention to provide such a device which will furnish either positive or negative counts without introducing a double zero error.

It is still a further object of this invention to provide such a device wherein the output count thereof can be automatically discontinued after the rotating shaft has rotated a predetermined amount.

It is another object of this invention to provide such a device wherein the output count may be frozen for any desired time, even though the motion of the input shaft continues, without impairing the accuracy of subsequent counts.

Other objects and advantages of the invention will appear in the following description:

Figure 1:
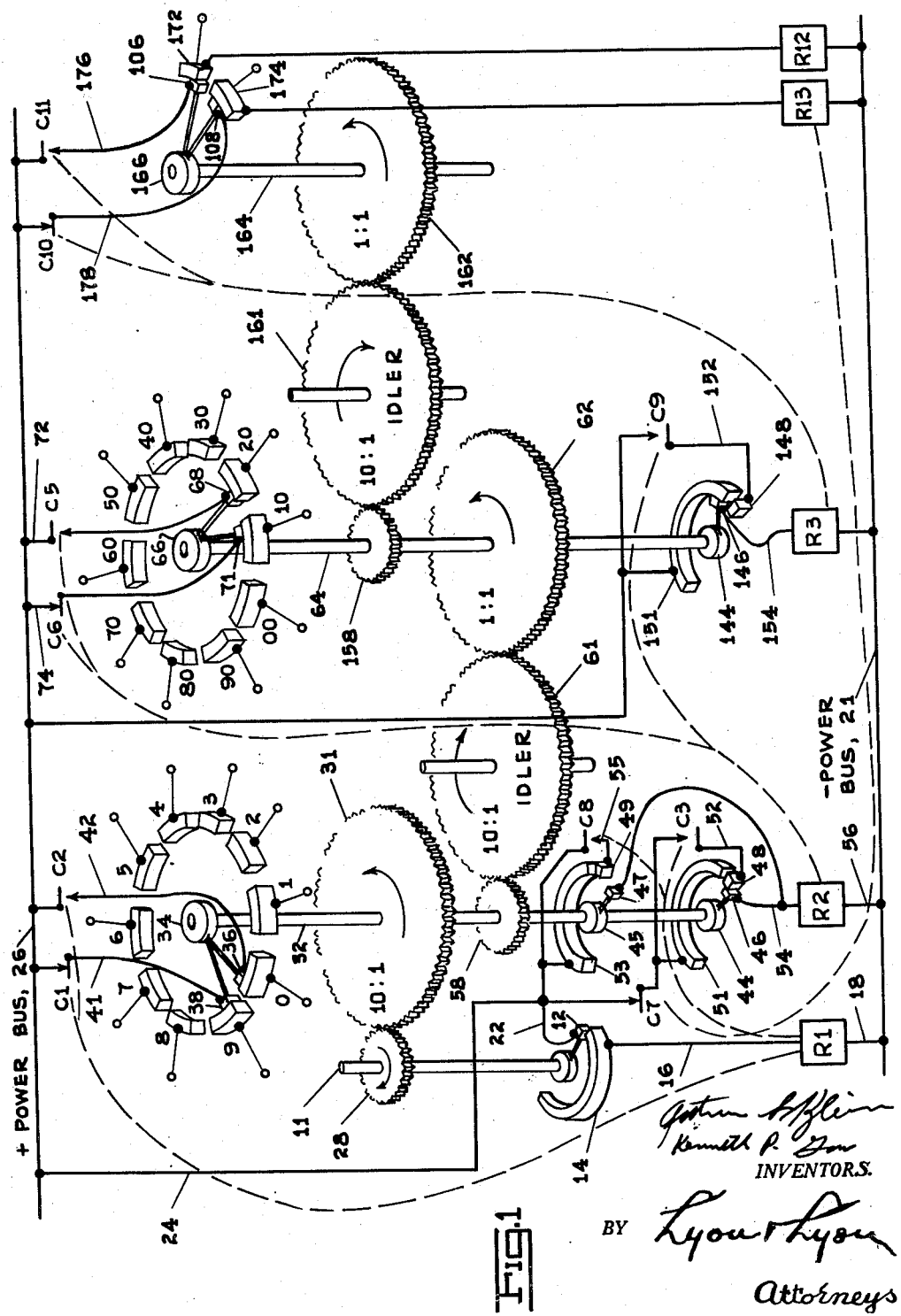
Figure 1 is a schematic drawing of an electrical counter embodying the invention.

Referring now to Figure 1, the numeral 11 designates an input shaft, the rotation of which is digitally counted by the device in a manner which will hereinafter be described. Integrally connected to the shaft 11 in any suitable manner is a rotating control contact 12 adapted to engage a fixed control contact 14. The fixed control contact 14 is mounted in spaced relation to the shaft 11 so that as the shaft 11, and with it the rotating control contact 12, revolves the contacts 12 and 14 form a closed electrical circuit during approximately one half of each revolution. Connected to the contact 14 by means of a conductor 16 is a control relay designated R-1 which, by means of a conductor 18, is electrically connected to the power bus 21. As seen, the rotating control contact is electrically connected by means of conductors 22 and 24 to the power bus 26. Fixedly mounted upon the shaft 11 is a spur gear 28 which meshes a second and larger spur gear 31. For reasons which will hereinafter be apparent, the gears 28 and 31 are designed to provide a ten to one speed stepdown between the shaft 11 and the shaft 32 on which the gear 31 is fixedly mounted. At the upper end of the shaft 32 is a hub 34 carrying a leading rotating contact 36 and a trailing rotating contact 38. Rotating contacts 36 and 38 are adapted to contact a plurality of equally spaced fixed output contacts designated by the numerals 0 through 9. The spacing between each adjacent fixed contact 0 through 9 is slightly greater than the width of either rotating contact 36 or 38 with the result that neither of these rotating contacts can simultaneously engage two adjacent fixed output contacts. The spacing between rotating contacts 36 and 38 is less than the width of the fixed output contacts 0 through 9 with the result that both rotating contacts 36 and 38 may simultaneously engage any of the fixed output contacts. The space relationship between rotating contacts 36, 38 and rotating control contact 12 is such that when rotating control contact 12 is engaging fixed contact 14 (which occurs at the start of a revolution of the input shaft 11) rotating contacts 36 and 38 will be engaging adjacent output contacts whereas ½ revolution later, at which time rotating control contact 12 will be disengaged from fixed control contact 14, rotating contacts 36 and 38 will simultaneously engage the same output contact. A conductor 41 connects the trailing rotating contact 38 to the power bus 26 through a break contact C-1. Similarly, the leading rotating contact 36 is connected to the power bus 26 by a conductor 42 through a make contact C-2. For reasons later to be described, the break contact C-1 is normally in a closed position and is opened by the relay R-1 when that relay is energized. On the other hand, make contact C-2 is normally open and is closed by the relay R-1 when the relay is energized. Many types of suitable relays and make and break contacts operated thereby are in common use and it is therefore deemed unnecessary to describe the structure of these elements in detail herein.

At the lower end of the shaft 32 is a hub 44 which carries a rotating control contact 46 adapted to contact fixed control contacts 48 and 51. As seen, fixed contact 51 extends approximately 180° and the length of fixed contact 48 is approximately $\frac{1}{10}$ that of contact 51. The contacts 48 and 51 are separated as shown, such separation being less than the width of the rotating control contact 46 to insure that such rotating contact will touch contact 51 before it leaves the fixed contact 48. The space relationship between rotating control contact 46 and rotating control contact 12 is such that rotating control contact 46 will engage fixed control contact 48 but not 51 when rotating control contact 12 is engaging fixed control contact 14 at the start of each ten revolutions of input shaft 11. Further, rotating control contact 46 will be engaging fixed control contact 51 before rotating control contact 12 disengages fixed control contact 14 which occurs after approximately ½ revolution of the input shaft 11. A conductor 52 electrically connects fixed contact 48 through a make contact C-3 to fixed contact 51. Fixed contact 51 is electrically connected through break contact C-7 to conductor 24 and accordingly power bus 26. Make contact C-3 is operated by relay R-1 in such manner that C-3 is closed when relay R-1 is energized. Break contact C-7 is normally closed being opened when a relay designated R-13 is energized. Rotating control contact 46 is electrically connected to power bus 21 through a relay R-2 by conductors 54 and 56. Near the lower end of shaft 32 is a hub 45 which carries a rotating control contact 47 adapted to contact fixed control contacts 49 and 53. As seen, fixed contact 53 extends approximately 144 degrees (corresponding to one revolution less of shaft 11 than the length of contact 51), whereas fixed contact 49 is the same as fixed contact 48 extending approximately 18 degrees. The contacts 49 and 53 are separated as shown, such separation being less than the width of the rotating control contact 47 to insure that such rotating control contact will engage contact 53 before it leaves fixed contact 49. The space relationship between rotating control contact 47 and rotating control contact 12 is such that rotating control contact 47 will engage fixed control contact 49, but not 53, when control contact 12 engages fixed control contact 14 at the start of the second revolution of input shaft 11. Further, rotating control contact 47 will engage fixed control contact 53 before rotating control contact 12 disengages fixed control contact 14 which occurs approximately ½ revolution later, that is, after approximately 1½ revolutions of the input shaft 11. A conductor 55 electrically connects fixed control contact 49 to conductor 24 and accordingly power bus 26 through a make contact C-8. Make contact C-8 is normally open and is closed when relay R-1 is energized. Fixed control contact 53 is electrically connected to conductor 24 and rotating control contact 47 is electrically connected to rotating control contact 46.

Fixedly mounted on shaft 32 is a spur gear 58 which meshes an idler spur gear 61 which in turn meshes spur gear 62. Spur gear 62 is fixedly mounted on a shaft 64 with the result that shaft 64 is driven by shaft 32 through gears 58, 61 and 62. The ratios between these gears is such that shaft 64 is caused to rotate at one tenth of the speed of shaft 32. At the upper end of shaft 64 is a hub 66 to which are fixed a leading rotating contact 68 and a trailing rotating contact 71. Rotating contacts 68 and 71 are adapted to contact a plurality of fixed output contacts 80 through 90. For reasons which will later be apparent, the spacing between adjacent fixed output contacts 80 through 90 is so related to the angular separation between rotating contacts 68 and 71 that both contacts 68 and 71 will simultaneously engage each of the fixed output contacts, that is, the trailing contact 71 will engage each fixed output contact before the leading rotating contact 68 has left such fixed output contact. Further, the spacing between each fixed output contact 80 through 90 is greater than the width of either rotating contact 68 or rotating contact 71 with the result that these rotating contacts will not simultaneously engage two adjacent fixed output contacts as the shaft 64 is rotated. The physical arrangement of the parts is such that rotating contacts 68 and 71 will each contact a separate adjacent fixed output contact when rotating control contact 46 is contacting fixed control contact 48, as seen in Figure 1, or when rotating control contact 47 is contacting fixed control contact 49. With such arrangement, during the entire first and after each ten revolutions thereafter of the input shaft 11, rotating contacts 68 and 71 will be contacting adjacent fixed output contacts. Further the physical relationship of the parts is such that rotating contacts 68 and 71 will be simultaneously engaging the same fixed output contacts when rotating control contacts 46 and 47 are disengaging fixed control contacts 51 and 53 respectively.

A conductor 72 electrically connects the leading rotating contact 68 to power bus 26 through a make contact C-5. Make contact C-5 is normally in an open position and is closed by relay R-2 when the latter is energized. Similarly, rotating contact 71 is electrically connected to power bus 26 by conductor 74 through break contact C-6. Break contact C-6 is normally in a closed position and is opened by relay R-2 when that relay is energized. At the lower end of the shaft 64 is a hub 144 which carries a rotating control contact 146 adapted to engage fixed control contacts 148 and 151. As seen, the size and spacing of contacts 146, 151, and 148 is identical with the size and spacing of contacts 46, 51 and 48. Further the spaced relationship of contact 146 with respect to rotating contacts 68 and 71 is identical with the spaced relationship of rotating control contact 46 with respect to rotating contacts 36 and 38. Fixed control contact 148 is electrically connected through make contact C-9 to fixed control contact 151 and power bus 26 by conductor 152. Rotating control contact 146 is electrically connected through relay R-3 to power bus 21 by conductor 154. Make contact C-9 is normally open and is closed by relay R-2 while that relay is energized.

Fixedly mounted on shaft 64 is a spur gear 158 which meshes an idler spur gear 161 which in turn meshes spur gear 162. Spur gear 162 is fixedly mounted on shaft 164 with the result that shaft 164 is driven by shaft 64 through gears 158, 161, and 162. The relationship between these gears is such that shaft 164 is caused to rotate at one-tenth the speed of shaft 64. At the upper end of shaft 164 is a hub 166 to which are fixed a leading rotating contact 106 and a trailing rotating contact 108. Rotating contacts 106 and 108 are adapted to engage a plus fixed contact 172 and a minus fixed contact 174. The spacing between fixed contacts 172 and 174 is greater than the width of either rotating contact 106 or 108 with the result that neither rotating contact can simultaneously engage both fixed contacts. The spacing between rotating contacts 106 and 108 is so related to the spacing between fixed contacts 172 and 174 that rotating contact 106 may engage fixed contact 172 at the same time that rotating contact 108 engages fixed contact 174. Further, the relationship between rotating contacts 106 and 108 and rotating contacts 68 and 71 of the tens decade selector is such that at a count in the neighborhood of zero revolutions of the input shaft 11, rotating contact 108 will engage minus fixed contact 174 and rotating contact 106 will engage plus fixed contact 172. In addition, the plus fixed contact 172 and the minus fixed contact 174 each extend for slightly more than $\frac{1}{10}$ revolution of the shaft 164. In addition, the spaced relationship between the rotating contacts 106 and 108 and the fixed contacts 172 and 174 is such that both rotating contacts 106 and 108 will simultaneously engage plus fixed contact 172 when rotating control contact 146 is disengaging fixed control contact 151 after approximately ½ positive revolution of the shaft 64. Both rotating contacts 106 and 108 will simultaneously engage fixed minus contact 174 when rotating control contact 146 is engaging fixed control contact 151 after approximately ½ revolution of the shaft 64 in the negative direction. As seen, plus fixed contact 172 is electrically connected to the power bus 21 through a plus relay R-12. Similarly minus fixed contact 174 is connected to the power bus 21 through a minus relay R-13. Rotating contact 108 is connected to power bus 26 through a break contact C-10 by conductor 178 and rotating contact 106 is similarly connected to power bus 26 through make contact C-11 by conductor 176. Break contact C-10 is normally closed and is opened by relay R-3 when that relay is energized. Make contact C-11 is normally open and is closed by relay R-3 when that relay is energized.

Interposed in the connections to the various rotating contacts are suitable slip rings and brushes to permit the proper rotation of the various rotating parts and at the same time maintain electrical connection. Similarly suitable mountings and bearings are provided for the various rotating shafts. Inasmuch as these parts are well known and their structural details form no part of the present invention they are not described herein in detail.

In the embodiment of the invention illustrated in Figure 1, but two decades and a plus-minus selector are shown. Thus, mechanism associated with the upper portion of the shaft 32 provides a units count while the mechanism associated with the upper portion of the shaft 64 provides a tens count. The mechanism associated with the upper portion of shaft 164 provides a plus-minus selection. If a higher count is desired, additional decades, identical to the tens decade associated with shaft 64 together with an additional control mechanism such as that at the bottom of shaft 32 or that at the bottom of shaft 164 may be added. Inasmuch as such additional decades are identical in all respects to the tens decade already described, they will not be described herein in detail.

Figure 2:
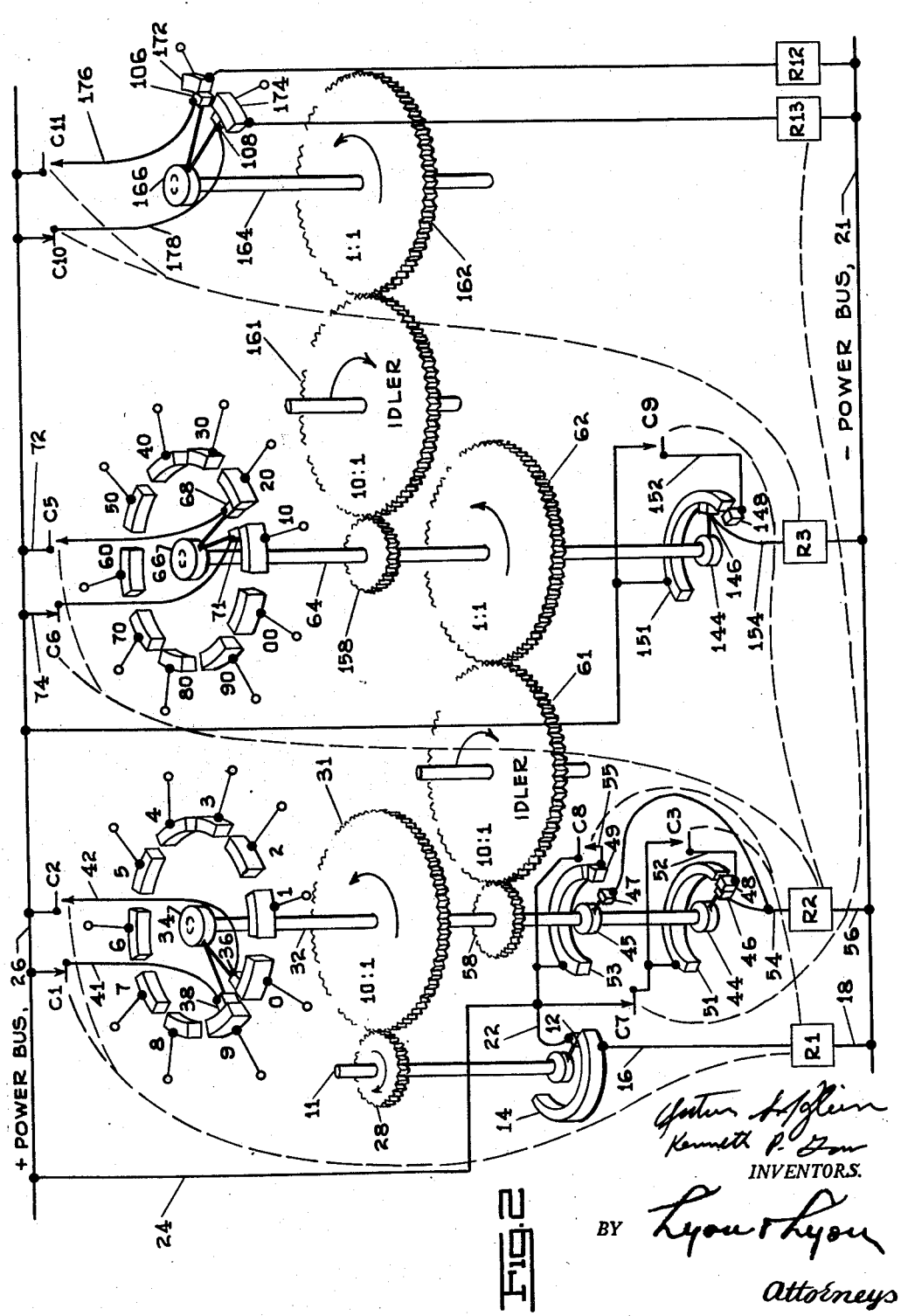
Figure 2 illustrates the device shown in Figure 1 at a different point of operation.
Figure 3:
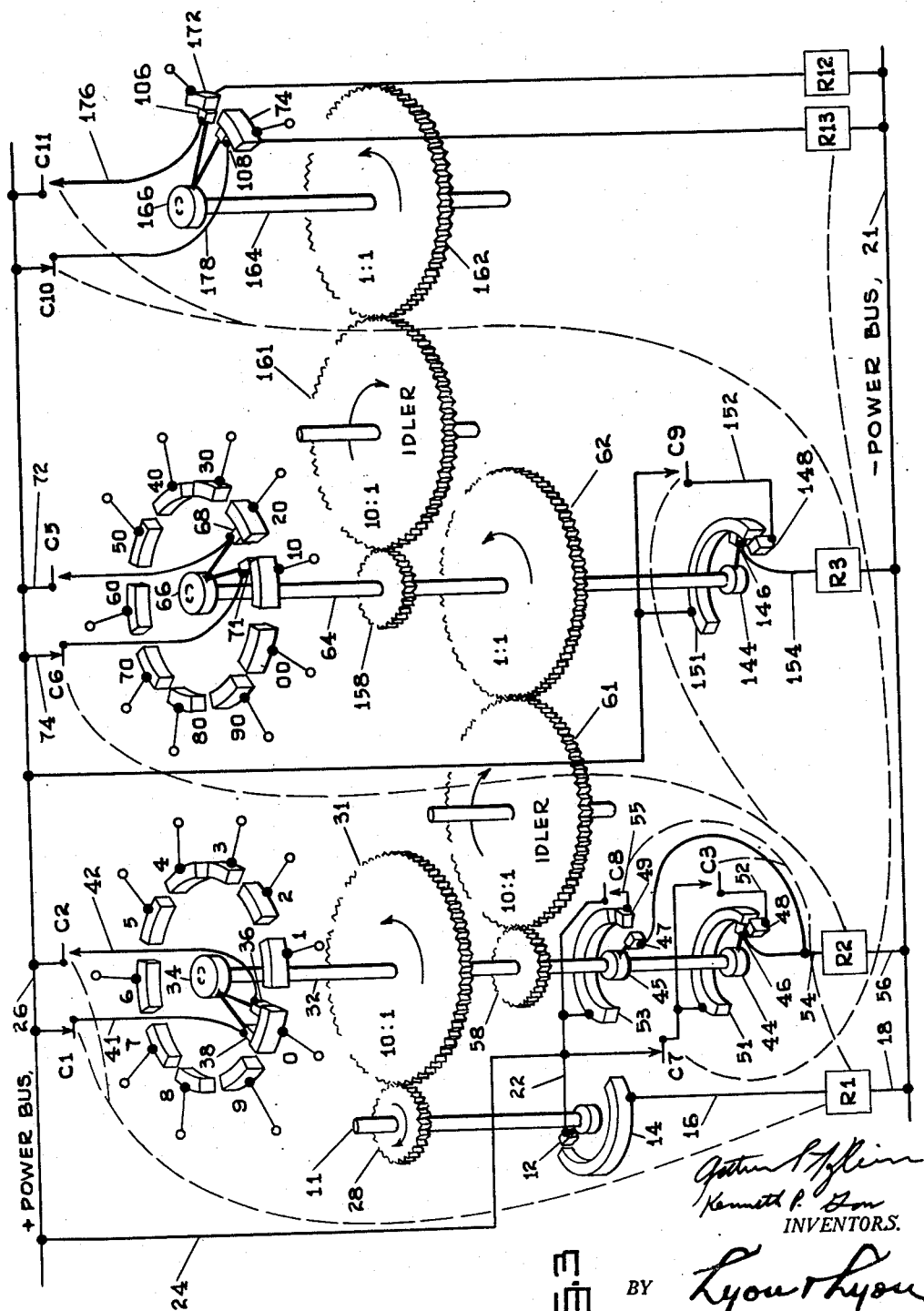
Figure 3 illustrates the device shown in Figure 1 at a still different point of operation.

Figures 2 and 3 are identical in all respects to Figure 1, except that these figures illustrate different positions of the various rotating contacts resulting from the rotation of shaft 11. These figures are included to aid in an understanding of the operation of the device shown in Figure 1 which will now be described.

The rotation of shaft 11 will cause the various rotating contacts to engage different fixed output contacts. Output leads are provided from each fixed output contact, as shown. These output leads are connected to a suitable indicating device, calculator or tabulator and by means of an electric current supply a digitized count of the angular rotation of the shaft 11. In Figure 1, the position of the rotating contacts represents the condition which will exist when the shaft 11 has rotated just less than 20 revolutions. As seen, the leading rotating contact 36 is engaging the fixed output contact 0 whereas the trailing rotating contact 38 is engaging the fixed output contact 9. At the outset, that is prior to any rotation of the shaft 11, the leading rotating contact 36 will engage the fixed output contact 0 while the trailing rotating contact 38 will engage the fixed output contact 9. As the shaft 11 rotates through one revolution leading rotating contact 36 will engage fixed output contact 1 while trailing rotating contact 38 will engage fixed output contact 0. Similarly, as shaft 11 rotates through two revolutions, rotating contacts 36 and 38 will engage fixed output contacts 1 and 2 respectively. In Figure 1, shaft 11 has rotated nearly 20 revolutions. At exactly 19 revolutions, rotating contacts 36 and 38 would engage fixed contacts 9 and 8 respectively while at 20 revolutions the rotating contacts would engage fixed contacts 9 and 0. As shown in Figure 1, fixed output contact 9 is being engaged by trailing rotating contact 38 while fixed output contact 0 is being engaged by leading rotating contact 36. Whether the supply of current flows through the output lead of fixed contact 9 or the output lead of fixed contact 0 providing thereby a count corresponding to 9 or 0 depends upon the condition of the contacts C-1 and C-2. These contacts are controlled by relay R-1 which in turn is controlled by the position of rotating control contact 12 relative to fixed control contact 14. Thus, when rotating control contact 12 is engaging fixed control contact 14, relay R-1 will be energized. Relay R-1, when so energized, will open the contact C-1 and close the contact C-2 with the result that the supply of current will flow through the output lead from fixed output contact 0. On the other hand, when, as shown in Figure 1, the rotating control contact 12 is not engaging the fixed control contact 14, the relay R-1 will not be energized with the result that contact C-1 will be closed whereas contact C-2 will be open. Under such conditions, the current will flow through the output leads from fixed output contact 9. As seen, the fixed control contact 14 extends 180° about the shaft 11. The spaced relationship between the fixed control contact 14, the fixed output contacts 9 and 0 and the rotating contacts 36 and 38 is such that at each complete revolution of the rotating shaft 11, the rotating control contact 12 will just engage the leading edge of fixed control contact 14 and rotating contacts 36 and 38 will each be engaging successive adjacent fixed output contacts. At this point, due to the energizing of relay R-1, the circuit including rotating contact 36 is activated while that of rotating contact 38 is open and the output count represented by current flow in the output leads is digitally increased by one unit. As the shaft 11 rotates an additional 180°, the rotating control contact 12 will reach the trailing edge of the fixed control contact 14. At this time the rotating contacts 36 and 38 will both engage the same fixed output contact as shown in Figure 3. When the rotating control contact 12 leaves the fixed control contact 14, the relay R-1 will be de-energized, the break contact C-1 will close and the make contact C-2 will open with the result that the output current will flow through the circuit of rotating contact 38. This condition will continue until the shaft 11 has rotated another 180° after which the rotating control contact 12 will again engage the fixed control contact 14. It should be noted that at the one-half revolution point, that is, when the rotating control contact 12 just leaves the trailing edge of the fixed control contact 14 thereby de-energizing the relay R-1, both rotating contacts 36 and 38 are engaging the same fixed output contact and no change in output count will result.

It is thus seen that by means of the fixed and rotating control contacts, the space rotating contacts 36 and 38 and the fixed output contact segments, the output of the units decade will always be digitized. That is, due to the operation of the relay R–1 on the make and break contacts C–1 and C–2, output current will flow through but one output lead for any angular position of the rotating shaft 11. Thus the angular rotation of shaft 11 is translated or counted digitally.

The operation of the tens count, which is very similar to that of the units count, will now be described. In a counter it is desirable that the decades transfer be rapid and exact and occur simultaneously with the units transfer from 9 to 0, rather than, as is customary in some types of mechanical counters have the units transfer from 9 to 0 precede the decades transfer with the result that the count goes from say, 19 to 10 to 20, rather than from 19 to 20 directly. This desirable result is accomplished in the device illustrated in Figures 1 through 3. Figure 1 shows the condition of the counter when the shaft 11 has rotated between 19½ and 20 revolutions. Figure 2 is the same as Figure 1 except that the shaft 11 has now rotated very slightly more than 20 revolutions. In Figure 3 the shaft 11 has rotated approximately one-half revolution from its position illustrated in Figure 1, being between 20 and 21 revolutions. Referring first to Figure 1, wherein the shaft 11 is just approaching the start of its 20th revolution, the count of the device is seen to be 19. Thus, the rotating contacts 68 and 71 are engaging fixed output contacts 19 and 20, respectively. Output current is, however, flowing only in the lead from fixed output contact 19. Referring to the control contacts 48, 51, and 46, at the lower end of shaft 32, it will be noted that rotating control contact 46 is engaging fixed control contact 48. This will not, however, energize relay R–2 inasmuch as make contact C–3 is open. As previously described, make contact C–3 is controlled by relay R–1 which relay is not energized during the latter portion of the 9 count. Since relay R–2 is not energized, make contact C–5 is open and break contact C–6 is closed with the result that current will flow through conductor 74 and the output lead from fixed output contact 19. Referring now to Figure 2, wherein the shaft 11 has just reached its 20th revolution, it is seen that rotating control contact 46 is still engaging fixed control contact 48. However, rotating control contact 12 on shaft 11 has now engaged fixed control contact 14, energizing relay R–1 which closes make contact C–3. The closing of make contact C–3 energizes the relay R–2 through break contact C–7 which is closed for positive rotations of shaft 11. R–2 in turn opens the break contact C–6 and closes the make contact C–5. Output current now flows through conductor 72 and the output lead of fixed output contact 20 and the indicated count has increased one decade. Referring now to Figure 3 wherein the shaft 11 has rotated approximately 20½ revolutions, it is seen that rotating control contact 46 is now engaging fixed control contact 51. Make contact C–3 is thereby by-passed with the result that the condition of the relay R–1 no longer affects the count of the tens decade.

In the embodiment of the invention illustrated in Figures 1 through 3, the size and spacings between the fixed output contacts in the tens decade is identical to those for the units decade. Similarly, the size and spacing between the rotating contacts 68 and 71 are identical to those for the rotating contacts 36 and 38. Thus the position of the rotating contacts 68 and 71 relative to the various fixed output contacts as the shaft 11 is revolved is the same as that heretofore described with relation to the units decade. Thus, when the shaft 11 has rotated through five units or one-half decade, both rotating contacts 68 and 71 will engage the same fixed output contact. Further, it is seen that the relationship between the control mechanism including fixed control contacts 48 and 51 and rotating control contact 46 to the decade output mechanism is the same as the relationship between the control mechanism including fixed control contact 14 and rotating control contact 12 to the units output mechanism. The decades positive control mechanism (contacts 46, 48, and 51) differs from the units control mechanism (contacts 12 and 14) only in the addition of the fixed control contact 48. This added contact is required to insure that the decade transfer is controlled by the units transfer from 9 to 0 for positive counts. The tens decade minus control mechanism (contacts 47, 49, and 53) differs from the tens decade positive control mechanism only in that the position of the tens decade transfer control is displaced by one clockwise rotation of shaft 11, that is by one positive count, the reason for which will be described hereinafter.

The operation of the plus-minus count, which is very similar to that of the tens count, will now be described. As shown in Figure 1, rotating control contact 146 is engaging fixed control contact 151 with the result that current can flow from power bus 26 to fixed output contact 151, through rotating contact 146 and through conductor 154 to relay R–3, thereby energizing relay R–3. Relay R–3 when energized will open break contact C–10 and close make contact C–11 causing current to flow through conductor 176 and the output lead from fixed plus contact 172. Current will therefore flow through plus relay R–12 energizing that relay. Inasmuch as the operation of the plus minus control mechanism (contacts 146, 148 and 151) is similiar to that of the tens positive control mechanism (contacts 46, 51 and 54) and as minus operation will be further explained herein, further explanation of the plus-minus control is deemed unnecessary.

In order to explain the minus count feature of the embodiment of the invention illustrated in Figures 1 through 3, let it be assumed that the shaft 11 has rotated in negative or counterclockwise direction 19 revolutions from its position shown in Figure 1. At this time the total positive or clockwise rotation of the shaft 11 will be slightly less than one revolution. The rotating control contact 12 will be adjacent to but not engaging the fixed control contact 14, rotating control contact 46 will engage fixed control contact 51, rotating control contact 47 will engage fixed control contact 49, leading rotating contact 36 will engage fixed output contact 1, trailing rotating contact 38 will engage fixed output contact 0, trailing rotating contact 71 will engage fixed output contact 90, leading rotating contact 68 will engage fixed output contact 60, rotating control contact 146 will engage fixed control contact 148, leading rotating contact 106 will engage fixed plus contact 172, trailing rotating contact 108 will engage fixed minus contact 174. Relays R–2, R–3, and R–12 will be energized. Contacts C–1, C–5, C-7, C-9 and C-11 will be closed. The supply of current will flow through the output leads of output contacts 0, 00, and plus fixed contact 172 providing a count of 0.

Next let it be assumed that the shaft 11 has reached its initial or starting position. At this time rotating control contact 12 will engage the leading edge of fixed control contact 14, leading rotating contact 36 will engage fixed output contact 0, trailing rotating contact 38 will engage fixed output contact 9, rotating control contact 47 will be disengaged, rotating control contact 46 will engage fixed control contact 48, leading rotating contact 68 will engage fixed output contact 00, trailing rotating contact 71 will engage fixed output contact 90, rotating control contact 146 will engage fixed control contact 148, leading rotating contact 106 will engage fixed plus contact 172, and trailing rotating contact 108 will engage fixed minus contact 174. Relays R-1, R-2, R-3 and R-12 will be energized. Contacts C-2, C-3, C-5, C-7, C-8, C-9 and C-11 will be closed. The supply of current will flow through the output leads of output contacts 0, 00, and plus fixed contact 172 for a count of 0. Next assume that shaft 11 has rotated in a clockwise or negative direction a fraction of one rotation with the result that rotating control contact 12 has disengaged fixed control contact 14. At this time relays R-1, R-2, R-3 and R-12 are deenergized and relay R-13 is energized. Contacts C-1, C-6 and C-10 will be closed. The supply of current will flow through the output leads of output contacts 9, 99, and fixed minus contact 174. In a manner which will now be explained, the counter will provide a minus 1 count.

As previously stated, output leads are provided from each fixed output contact. These output leads are normally connected to a suitable indicator, calculator or tabulator. In order to use the embodiment of the counter illustrated in Figures 1 through 3, for indicating negative rotations of the shaft 11 it is necessary to reidentify each of the output leads from the fixed output contacts. This is accomplished by means of contacts, not shown, associated with the relays R-12 and R-13. When relay R-12 is energized the indicated count corresponds to the numbering given each fixed output contact in Figures 1 through 3. On the other hand, when a minus count exists and minus relay R-13 is energized the indicator count is by means of suitable contacts altered such that fixed output contact 9 when energized, provides a 1 count, fixed output contact 8 provides a 2 count, etc. The only units indication which remains unchanged is that provided by fixed output contact 0. The indicated count from the tens decade is reidentified such that the fixed output contact 90 provides a 00 indication, fixed output contact 80 provides a 10 indication, etc., with fixed output contact 00 providing a 90 indication. With such reidentification, resulting from the energizing of minus relay R-13, the device shown in Figures 1 through 3 will provide a digitized count for negative or counterclockwise rotation of the shaft 11 in a manner similar to that previously described for positive or counterclockwise shaft rotations.

Inasmuch as the various fixed output contacts, when energized, provide a different indication when counterclockwise or negative shaft rotations are measured than when clockwise or positive shaft rotations are measured, it is apparent that some means must be provided to effectuate the tens transfer at a different position when negative rather than positive counts exist. Thus, for positive counts, the tens transfer must occur as the count passes from 9 to 0. As previously explained this occurs when rotating control contact 12 engages fixed control contact 14 and leading rotating contact 36 is engaging fixed output contact 0 with trailing rotating contact 38 engaging fixed output contact 9. For negative shaft rotation, if the tens transfer is to occur as the minus count changes from 9 to 0, such transfer must be effectuated by rotating control contact 12 engaging the leading edge of fixed control contact 14 when leading rotating contact 36 is engaging fixed output contact 1 and trailing rotating contact 38 is engaging fixed output contact 0. In the device shown in Figures 1 through 3, this is accomplished in the following manner. Since for negative counts, minus relay R-13 is energized and plus relay R-12 is deenergized, break contact C-7 is open with the result that rotating control contact 46 is no longer effective in energizing relay R-2 and thereby causing the tens transfer. However, for minus counts, rotating control contact 47, which is by-passed for positive counts, is effective for energizing relay R-2 and thereby causing the tens transfer in the following manner. When the rotating shaft 11 has rotated so that rotating control contact 12 engages fixed output contact 14, and leading rotating contact 36 engages the fixed output contact 1, then rotating control contact 47 will be engaging fixed control contact 49. Relay R-1 being energized, contact C-8 will be closed and current will flow from power bus 26 through conductor 24, through contact C-8, through conductor 55, through fixed control contact 49, through rotating control contact 47, and through conductor 54, energizing relay R-2. As previously explained, when the shaft 11 has rotated approximately 10 revolutions, rotating contacts 68 and 71 will each engage adjacent fixed output contacts on the tens decade and therefore, when the circuit to rotating contact 68 is closed by make contact C-5 operated by relay R-2 and the circuit to rotating contact 71 is opened a tens transfer will occur. Thus, for minus counts, the tens transfer occurs as output current is transferred from fixed output contacts 0 to 1 or 1 to 0 depending upon the direction of rotation of the shaft 11.

While there is illustrated only a units and tens decade and a plus-minus selector, it is apparent that additional decades may be added as desired. Thus, a hundreds decade, in all respects identical to the tens decade may be employed. The control mechanism for such hundreds decade will be the same as the tens decade positive control mechanism with the result that the tens decade will control the transfer of the hundreds decade.

In the embodiment of the invention illustrated in Figures 1 through 3, an interruption of the power and current to power bus 26 would cause the failure of output current to flow. However, upon the restoration of current and power to power bus 26, the position of the various rotating contacts would cause the correct relays to be energized, which in turn would produce the correct decade transfer and permit output current to flow in the output leads attached to the correct fixed output contacts. Thus a power interruption would not affect the accuracy of any counts provided after the power has been restored. Further, since the device is operated directly from a direct current power source indicated by the power busses 21 and 26, it will in no way be affected by electrical disturbances which frequently upset the accuracy of certain electronic counters which have been proposed.

Figure 4:
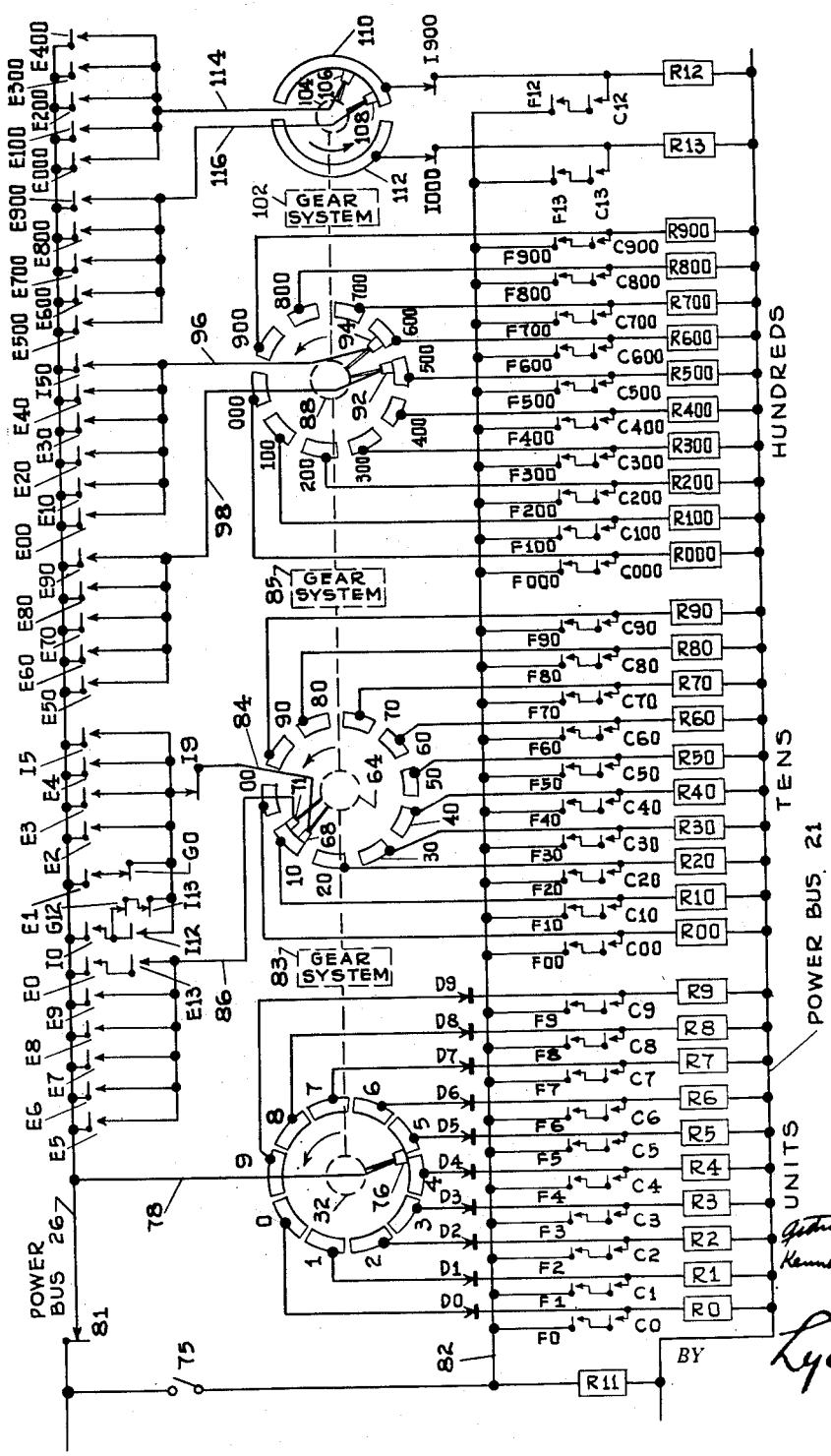
Figure 4 is a schematic diagram illustrating a second embodiment of the invention.

Referring now to Figure 4, a second embodiment of the invention is illustrated. It has been found that the counter illustrated in Figure 4, even though somewhat more complicated than that shown in Figures 1 through 3, is considerably more flexible and consequently has a wider field of use. The essential differences between the two devices are first that in the Figure 4 counter, each fixed output contact is provided with and operates its own individual relay. These individual relays make possible a number of output circuits from each with the result that the device may be employed to simultaneously provide the input to a number of indicating and tabulating mechanisms. In addition, the individual relays make possible the elimination of the various control mechanisms shown in Figures 1 through 3. Further, the presence of the individual relays makes possible a freezing circuit whereby the output count of the device may be frozen while readings are taken without disturbing the movement of the rotating parts and consequently the operation of the device. Still another advantage of the device shown in Figure 4 is that the individual relays provided therein make possible the provision of a limiting circuit whereby after the input shaft has revolved a predetermined number of times, the output circuits can be de-energized. This latter feature has been found very desirable in certain experimental work wherein various data indicated by shaft rotation become inaccurate after a certain maximum number of such rotations.

The left portion of Figure 4 illustrates the units count mechanism. As seen, fixedly mounted upon a shaft 32 is a rotating contact 76 adapted to engage a plurality of fixed output contacts 0 through 9, which are connected by suitable conductors to the power bus 21. Shaft 32 is preferably geared to an input shaft such as shaft 11 of Figure 1, although it may be used as the input shaft to the counter.

In each of the circuits from the power bus 21 to the fixed output contacts is a relay; relay R-0, being identified with fixed output contact 0; relay R-1 being identified with fixed output contact 1, etc. Also, in each of the circuits connecting the power bus 21 to the fixed contacts is a rectifier D. Each rectifier is identified with the fixed output contact to which it is connected by the appropriate subscript. The fixed output contacts 0 through 9 are also connected to a freeze bus 82 through the above mentioned rectifiers and through a pair of make contacts as follows. Referring to fixed contact 0, there is seen a pair of make contacts C-0 and F-0 which are connected in series. Make contact C-0 is normally open, being closed by relay R-0 when that relay is energized. Similarly, make contact F-0 is operated by a freeze relay designated R-11 in such manner that when R-11 is energized by the closing of a switch 75, make contact F-0 is closed. Fixed output contact 1 is connected to freeze bus 82 through rectifier D-1, a make contact C-1 and a make contact F-1. Make contact C-1 is closed by relay R-1 when that relay is energized and make contact F-1 is closed by freeze relay R-11 when that relay is energized. In an identical manner, each of the remaining fixed output contacts 2 through 9 is connected to the freeze bus 82 through a rectifier and a pair of series connected make contacts, one of which is closed by freeze relay R-11 and the other of which is closed by the relay identified with the particular fixed output contact.

The rotating contact 76 is electrically connected to the power bus 26 by the conductor 78. In the power bus 26 is a break contact 81. Break contact 81 is opened by relay R-11 when that relay is energized. Break contact 81 is so operated by relay R-11 that it is opened after contacts F-0 through F-9, F00 through F-90, F-000 through F-900, F-13 and F-12 are closed by relay R-11.

An input shaft, not shown in Figure 4, is mechanically linked to shaft 32 by a suitable gear system in such a manner that shaft 32 rotates at one-tenth the speed of such input shaft. Shaft 32 is mechanically linked to a third shaft 64 by a suitable gear system indicated diagrammatically at 83. The gear ratio of such gears is such that the shaft 64 rotates at one-tenth the speed of the shaft 32. Fixedly carried by the shaft 64 are rotating contacts 68 and 71 adapted to engage a plurality of fixed output contacts 00 through 90. Each of these fixed contacts is electrically connected to power bus 21 through a separate relay. The individual relays are identified by the appropriate subscript.

Each of fixed output contacts 00 through 90 is connected to the freeze bus 82 through a pair of make contacts as follows. Referring to fixed contact 00 there is seen a pair of make contacts C-00 and F-00 which are connected in series. Make contact C-00 is operated by relay R-00 in such manner that when R-00 is energized, contact C-00 is closed. Similarly make contact F-00 is operated by freeze relay R-11 in such manner that when R-11 is energized by the closing of switch 75, make contact F-00 is closed. Similarly, fixed output contact 10 is connected to freeze bus 82 through a make contact C-10 and a make contact F-10. Make contact C-10 is closed by relay R-10 when that relay is energized and make contact F-10 is closed by freeze relay R-11 when that relay is energized. In an identical manner, each of the remaining fixed output contacts 20 through 90 is connected to freeze bus 82 through a pair of series connected make contacts, one of which is closed by freeze relay R-11 and other of which is closed by the relay identified with the particular fixed output contact.

Leading rotating contact 68 is connected to power bus 26 by means of a conductor 84 through a number of relay operated make or break contacts. Similarly, trailing rotating contact 71 is connected to power bus 26 by means of a conductor 86 and a number of relay operated make or break contacts. Thus in series with the conductor 84 is a break contact I-9. Break contact I-9 is normally closed but is opened by relay R-9 when the latter is energized. Parallel paths between conductor 84 and power bus 26 are provided by contacts I-0, I-5, I-12, I-13, G-0, G-12, E-1, E-2, E-3, and E-4. Contact I-0 is a make contact, normally open, which is closed by relay R-0 when the latter is energized. Contact I-5 is a make contact, normally open, which is closed by relay R-5 when the latter is energized. Contact I-12 is normally open, being closed by plus relay R-12, shown at the lower right portion of Figure 4, when that relay is energized. Contact I-13 is a break contact which is normally closed but which is opened by minus relay R-13 when the latter is energized. Contact G-0 is a break contact, normally closed, which is opened by relay R-0 when that relay is energized. Contact G-12 is a break contact, normally closed, which is opened by relay R-12 when the latter is energized after contact I-12, operated by the same relay, is closed. Contact E-1 is a make contact, normally open, which is closed by relay R-1 when the latter is energized. In like manner contact E-2 is a make contact closed by relay R-2, contact E-3 is a make contact closed by relay R-3, contact E-4 is a make contact closed by relay R-4, and contact I-5 is a make contact closed by relay R-5. Rotating contact 71 is connected to power bus 26 through a group of parallel contacts E-5 through E-9. In parallel with these contacts are an additional pair of series connected contacts E-0 and E-13. Contact E-5 is a make contact which is normally open but is closed by relay R-5 when that relay is energized. Similarly, contact E-6 is closed by relay R-6, contact E-7 is closed by relay R-7, contact E-8 is closed by relay R-8, and contact E-9 is closed by relay R-9 while contact E-0 is closed by relay R-0. Contact E-13 is closed by the minus relay R-13 before break contact I-13 is opened when relay R-13 is energized.

Each of the fixed output contacts 00 through 90 in the tens decade is connected to the power bus 21 through a separate relay. These relays are indicated as R-00 through R-90, the subscripts identifying each with its related fixed output contact.

Referring now to the hundreds decade shown in Figure 4, it is seen that this decade is very similar to the tens decade hereinabove described. Thus, a gear system 85 connected to shaft 64 rotates shaft 88 at a speed one-tenth that of shaft 64. Carried by shaft 88 is a trailing rotating contact 92 and a leading rotating contact 94. These rotating contacts are adapted to engage a plurality of fixed output contacts 000 through 900. The spacing between each adjacent fixed output contact is greater than the width of either rotating contact 92 or rotating contact 94 with the result that neither of these rotating contacts can simultaneously engage two adjacent fixed contacts. The spacing between rotating contacts 92 and 94 is less than the width of the fixed output contacts 000 through 900 with the result that both rotating contacts 92 and 94 may simultaneously engage any of the fixed output contacts. The relationship between rotating contacts 92 and 94 and rotating contacts 68 and 71 of the tens decade is such that when the tens count is changing from 90 to 00, that is, when rotating contacts 68 has engaged fixed output contact 00 and rotating contact 71 has engaged fixed output contact 90, then rotating contact 94 will be engaging one fixed output contact of the hundreds decade while rotating contact 92 will engage the preceding fixed contact of such decade. Thus, as the tens count is changing from 90 to 00, the hundreds count will be transferring to the next higher hundred count. Each fixed output contact of the hundreds decade is connected to the power bus 21 through an individual relay. These relays are identified with the fixed output contact to which they relate by the appropriate subscript. In addition, each of the fixed output contacts is connected to the freeze bus 82 through a pair of make contacts, identified as C and F with the appropriate subscript. Thus, fixed output contact 000 is connected to freeze bus 82 through make contacts C-000 and F-000 and fixed output contact 100 is so connected through make contacts C-100 and F-100. The C contacts are normally open and are closed by the relays R. Thus, contact C-000 will be closed when R-000 is energized and contact C-100 will be closed when relay R-100 is energized. Each of the F contacts is normally open and will be closed by the freeze relay R-11. When relay R-11 is energized, the entire group of contacts, F-000 through F-900 will be closed.

Rotating contact 94 is connected to power bus 26 by conductor 96 through a group of relay operated contacts E-00 through E-40 and I-50. Similarly, rotating contact 92 is connected to power bus 26 by conductor 98 through relay operated contacts E-50 through E-90. Each of these contacts is make contact, that is, it is normally open, but is closed when the particular relay by which it is operated is energized. These contacts are operated by the relay R-00 through R-90 of the tens decade and each contact is identified with the particular relay by which it is operated by the appropriate subscript. Thus, contact E-00 will be closed by relay R-00, contact E-10 will be closed by relay R-10, etc. Relay R-50 operates both contact I-50 and contact E-50, closing these contacts when the relay is energized.

At the right hand portion of Figure 4 is shown the plus-minus selector circuit. As seen, this circuit is quite similar to each of the decades heretofore described. A gear system indicated generally as 102 is connected to shaft 88 and is utilized to drive a shaft 104. The gear system 102 is such that the shaft 104 will be driven at a lower speed than shaft 88. Unlike the three decades previously described, however, the step-down ratio of the gear system 102 is not critical. For reasons which will hereinafter become apparent, this ratio may vary from a slightly over two to ten to one with satisfactory results. The system shown in Figure 4 utilizes a four-to-one step-down which has been found very satisfactory in operation. Connected to the shaft 104 is a leading rotating contact 106 and a trailing rotating contact 108 adapted to engage a plus fixed contact 110 and a minus fixed contact 112. The spacing between fixed contacts 110 and 112 is greater than the width of either rotating contact 106 or 108 with the result that neither rotating contact can simultaneously engage both fixed contacts. The spacing between rotating contacts 106 and 108 is so related to the spacing between fixed contacts 110 and 112, that rotating contact 108 may engage fixed contact 112 at the same time that rotating contact 106 is engaging fixed contact 110. Further, the relationship between rotating contacts 106 and 108 and rotating contacts 92 and 94 of the hundreds decade is such that at a count in the neighborhood of zero, at which time the rotating contact 94 will engage the fixed output contact 000 and the rotating contact 92 will engage the fixed output contact 900, rotating contact 108 will engage minus contact 112 and rotating contact 106 will engage plus fixed contact 110. Further, the gear ratio of system 102 is such that before the hundreds decade has reached a count of plus 500, both rotating contacts 106 and 108 will engage plus fixed contact 110. Similarly, before a count of minus 500 has been reached, both rotating contacts 106 and 108 will have engaged fixed minus contact 112. In addition, the length of fixed contacts 110 and 112 and the gear ratio of gear system 102 must be such that at the maximum count, either plus or minus, of the device the rotating contacts 106 and 108 have not rotated a sufficient amount so as to disengage the appropriate fixed plus or minus contact. As seen, fixed plus contact 110 is connected to power bus 21 through a break contact I-900 and a plus relay R-12. Similarly, fixed minus contact 112 is connected to power bus 21 through break contact I-000 and minus relay R-13. Break contact I-900 is normally closed being opened by relay R-900 of the hundreds decade when that relay is energized. Break contact I-000 is similarly normally closed being opened by relay R-000 when that relay is energized. Fixed plus contact 110 is also connected to freeze bus 82 through break contact I-900, a make contact C-12 and a freeze contact F-12. In like manner, fixed minus contact 112 is connected to freeze bus 82 through break contact I-100 and make contacts C-13 and F-13. Make contact C-12 is normally open, being closed by relay R12 when that relay is energized. Make contact C-13 is closed by relay R-13 when that relay is energized. Freeze contacts F-12 and F-13 are operated by the freeze relay R-11 being closed when that relay is energized.

As seen, rotating contact 106 is connected to power bus 26 by a conductor 114 and a group of parallel make contacts E-000 through E-400 and rotating contact 108 is similarly connected to power bus 26 by conductor 116 through a group of make contacts E-500 through E-900. The make contacts E-000 through E-900 are normally open and are operated by the group of relays associated with the hundreds decade. Thus, contact E-000 is closed by relay R-000 when that relay is energized. Similarly, contact E-100 is operated by relay R-100, contact E-200 is operated by relay R-200, etc.

The operation of the device illustrated in Figure 4 is similar to that shown in Figures 1 through 3. Thus, the rotation of the shaft 11 (not shown in Figure 4) will cause the rotation of shafts 32, 64, 88 and 104. As these shafts rotate, the rotating contacts associated with them will rotate and a digitized count 3 in the form of electrical impulses, corresponding to the number of revolutions of the shaft 11 will be provided by the fixed output contacts of each decade engaged by the rotating contacts of that decade. Further there are no rotating parts subjected to intermittent motion or high angular accelerations and the torque required to rotate the shaft is constant, irrespective of the shaft position. Thus, the shafts may rotate at very high speeds without causing mechanical failure.

Unlike the device shown in Figures 1, 2 and 3, however, the fixed output contacts of each decade do not directly supply output current to the indicating circuit with which the device is operated. Rather associated with plus relay R12, minus relay R-12, and with the relays of each decade, that is, relays R-0 through R-9, relays R-00 through R-90, and relays R-000 through R-900, and operated thereby, are a corresponding series of make contacts which are utilized to energize the proper digital indication in the indicator circuit. For example, referring to the units portion of the indicator, when the relay R-5 and the plus relay R-12 are energized these relays will operate to close contacts in the indicator which will cause plus five count indication. In addition, to prevent a double indication in the indicator circuit employed when the rotating contact 76 is bridging two fixed output contacts, as shown in Figure 4, an additional break contact is provided in the five-count circuit of the indicator which is maintained in an open condition when the relay R-4 is energized. Inasmuch as relay operated indicator circuits of this type are well known and since the particular indicator, tabulator or calculator to be used in conjunction with the device of the present invention forms no part of such invention, it will not be described herein in any detail.

In Figure 4 the position of the rotating contacts represents the condition which will exist when the shaft 11 has rotated in the positive or counterclockwise direction between 614 and 615 revolutions. As seen, the rotating contact 76 of the units decade is therefore engaging both fixed output contacts 4 and 5. Relays R-4 and R-5 are therefore energized and as above explained, the indicating circuit used in conjunction with the device will provide a four-count. Due to the fact that relays R-4 and R-5 are energized, make contacts E-5, I-5 and E-4 will be closed. Two closed circuits from power bus 23 to fixed output contact 10 are therefore provided, one through conductor 86 and the other through conductor 84, which lead to rotating contacts 68 and 71, both of which are engaging the fixed output contact 10. Relay R-10 will be thereby energized. The energizing of relay R-10 will provide a ten-count indication for the indicator. Relay R-10 being energized, make contact E-10 will be closed. This will provide a closed circuit for current flow from the power bus 26 through conductor 96 to leading rotating contact 94, which, as shown, is engaging fixed output contact 600. The current flow from power bus 26 will then energize relay R-600, which in turn will provide a 600 count for the indicator used. It will be observed in Figure 4 that trailing rotating contact 92 is engaging fixed output contact 500. Inasmuch, however, as the make contacts E-50 through E-90 are open, no current can flow from the power bus 26 through the rotating contact 92 and the relay R-500 will not be energized.

It will be observed that inasmuch as the input rotating shaft 11 has rotated in the counterclockwise or positive direction, a considerable number of revolutions, both rotating contacts 106 and 108 are engaging the fixed contact 110 of the plus-minus selector. Since the make contact E-600 will be closed by the energized relay R-600, current will flow from the power bus 26 through the conductor 116, energizing the plus relay R-12. Suitable contacts operated by the relay R-12, are provided in the indicator to show a positive count when relay R-12 is energized.

In the event it is desired to freeze a particular reading so as to provide sufficient time to take such reading without otherwise disturbing the operation of the device, freeze switch 75 is closed. This energizes relay R-11 which in turn closes each of the make contacts F-0 through F-9, F-00 through F-90, F-000 through F-900, F-13 and F-12. Referring again to the units decade, as above described, for the count indicated in Figure 4, the relay R-4 will be energized. This will close the make contact C-4 and provide an additional closed circuit from the power bus 26 through the switch 75, through the new closed contact F-4 and through the closed contact C-4. As herein above described, freeze relay R-11 will first close the various make contacts indicated by the letter F and will then open the break contact 81 with the result that current can no longer flow through that portion of the power bus 26 following contact 81. It is therefore apparent that the relay R-4 will remain energized so long as the freeze switch 75 is closed and that the position of the rotating contact 76 will have no effect whatever upon the indicated count. For the particular count shown in Figure 4, both relays R-4 and R-5 will be energized but, as previously explained, the indicator will show only the four count. When the rotating contact 76 rotates so as to simultaneously engage the fixed output contacts 5 and 6, it is apparent that were it not for the rectifier D-5, current could flow from the power bus 26, through switch 75, through contact F-5, through contact C-5, through the fixed output contact 5, through the rotating contact 76 and through the fixed output contact 6 to the relay R-6 energizing such relay. Similarly, all of the relays of the units decade would be energized as the rotating contact 76 rotates. Each of these relays would remain energized so long as the freeze switch 75 were held closed, and the units count supplied to the indicator would be meaningless. In order to prevent this occurrence, the rectifiers D-0 through D-9 are provided. Referring again to Figure 4, as above described, the contacts F-5 and C-5 are closed. Current cannot flow to the fixed contact 5, however, due to the presence of the rectifier D-5. Similarly, when the rotating contact 76 has rotated so as to simultaneously engage fixed output contacts 3 and 4, while contacts C-4 and F-4 are closed, current cannot flow to the fixed output contact 3 due to the presence of the rectifier D-3. It will be observed that the presence of these rectifiers in no way affects the normal operation of the device when the freeze circuit is not being employed inasmuch as the direction of current then will be such that the current will pass readily through the rectifiers. No rectifiers are utilized for the tens or hundreds decades. They are unnecessary in such decades inasmuch as the widths of the rotating contacts therein are insufficient to simultaneously engage adjacent fixed output contacts.

In order to explain the tens transfer of the device shown in Figure 4, let it be assumed that the rotating contact 76 has advanced in a counterclockwise direction so that it is bridging fixed output contacts 9 and 0. At this time both relays R-9 and R-0 will be energized. This will close make contacts E-9, E-0 and I-0. Further, break contacts I-9 and G-0 will be opened. A closed circuit is thereby provided from the power bus 26 through the make contact E-9, through the conductor 86 to the rotating contact 71 and the relay R-10 will remain energized. The spacing is such that when the fixed contact 76 has advanced so as to simultaneously engage the fixed contacts 9 and 0, the rotating contact 68 will have engaged the next higher tens output contact. Thus in the example under discussion, the rotating contact 71 will engage the fixed output contact 10 while the rotating contact 68 will have engaged the fixed output contact 20. Relay R-20, however, will not be energized inasmuch as break contact I-9 will be held open so long as relay R-9 is energized. Thus but a single tens count will be supplied. As the rotating contact 76 advances so as to engage only the fixed output contact 0, the relay R-9 will no longer be energized and break contact I-9 will close. While make contact E-0 will be closed by relay R-0, current cannot flow through conductor 86 to rotating contact 71 inasmuch as make contact E-13, which is operated by the minus relay R-13, will be opened. A closed circuit will be formed, however, from power bus 26 through make contact I-0, make contact I-12, which, as previously explained, is held closed during positive counts by plus relay R-12, break contact I-9 and through conductor 84 to rotating contact 68. Relay R-20 then will be energized and a twenty count will be supplied to the indicator. Thus as the rotating contact 76 advances from fixed output contact 9 to fixed output contact 0, the tens count changes from ten to twenty.

The transfer of the hundreds decade is similar to that just described for the tens decade. Assuming, for example, that the shaft 11 in Figure 4 has rotated in a counterclockwise direction between 699 and 700 revolutions, the rotating contact 76 will simultaneously engage fixed output contacts 0 and 9, the rotating contact 68 will engage fixed output contact 00, the rotating contact 71 will engage fixed output contact 90, rotating contact 94 will engage fixed output contact 700 and rotating contact 92 will engage fixed output contact 600. At this time make contacts E-30 through E-40 and I-50 will be open with the result that relay R-700 will not be energized. On the other hand, make contact E-90 will be closed and relay R-600 will be energized with the result that the hundreds decade will supply a six hundred count. When the shaft 11 has advanced to a full seven hundred revolutions, relay R-9 will no longer be energized with the result that make contacts E-9 will open and break contact I-9 will close. Current will no longer flow to fixed output contact 90 and relay R-90 will not be energized. On the other hand, current will flow through the conductor 84 to the fixed output contact 00 and relay R-00 will be energized. This in turn will close make contact E-00 and open make contact E-90 with the result that current will flow through the conductor 96 to the fixed output contact 700, which, at this time, will have been engaged by the rotating contact 94. No current will flow through the conductor 98 and the rotating contact 92 to the fixed output 600 with the result that relay R-600 will not be energized.

In order to explain the minus count feature of the embodiment of the invention illustrated in Figure 4, let it be assumed that the direction of rotation of the shaft 11 has been reversed and that the shaft has rotated in a clockwise direction approximately 614 revolutions from its position shown in Figure 4. At this time the total positive, or counterclockwise rotation of the shaft 11 will be less than one revolution. At this time the rotating contact 76 will be simultaneously engaging fixed contacts 1 and 0, rotating contact 68 will engage fixed output contact 00, rotating contact 71 will engage fixed output contact 90, rotating contact 94 will engage fixed output contact 000, rotating contact 92 will engage fixed output contact 900, rotating contact 108 will engage fixed minus contact 112 and rotating contact 106 will engage fixed plus contact 110. Relays 0 and 1 will be energized, relay 00 will be energized, relay 000 will be energized and plus relay R-12 will be energized. Next, let it be assumed that the shaft 11 has reached its initial or starting position. At this time the rotating contact 76 will be engaging the fixed output contact 0 only and the relays R-0, R-00, R-000 and R-12 will be energized. Relay R-13 will not be energized, despite the fact that rotating contact 108 will engage fixed minus contact 112, inasmuch as make contacts E-510 through E-900 will be open. Next, assume that shaft 11 has rotated in a clockwise or negative direction a fraction of one rotation with the result that rotating contact 76 simulataneously engages fixed output contacts 0 and 9. At this time relays R-0, R-9, R-90, R-900 and minus relay R-13 are energized. Plus relay R-12 will no longer be energized inasmuch as make contacts E-000 through E-400 are open. In a manner which will now be explained, the device, in such position, will provide a minus 1 count.

As previously stated, a suitable indicator circuit may be employed in connection with the device illustrated in Figure 4. The various relays R-0 through R-9, R-00 through R-90 and R-000 through R-900 operate a corresponding series of make contacts which energize the proper digit indication in such indicator circuit. Thus, when a positive count exists, relay R-1 closes a make contact in the indicator circuit which results in an indicated count of 1. Similarly, each of the other relays in each decade, when energized, results in the proper indicated count on the indicator. For reasons which will now be explained, to provide a minus count it is necessary to reidentify each of the decade relays with the indicator count. This is accomplished by means of the plus-minus relays R-12 and R-13. When relay R-12 is energized the indicated count corresponds to the numbering given each decade relay in Figure 4. On the other hand, when a minus count exists and minus relay R-13 is energized the indicator count is, by means of suitable contacts, altered such that relay R-9, when energized, provides a 1 count, relay R-8 provides a 2 count, relay R-7 provides a 3 count, etc. The only units indication which remains unchanged is that provided by relay R-0, which, at all times, provides a 0 indicated count. The indicated count from the tens decade is re-identified such that the relay R-90 provides a 00 indication, relay R-80 provides a 10 indication, relay R-70 provides a 20 indication, etc., with relay R-00 providing a 90 indication. Similarly, in the hundreds decade, the relay R-900 provides a 000 indication, the relay R-800 provides a 100 indication, etc. With such re-identification, resulting from the energizing of minus relay R-13, the device shown in Fig. 4 will provide a digitized count for clockwise rotation of the shaft 11 in a manner similar to that previously described for counterclockwise shaft rotations.

Inasmuch as the various decade relays, when energized, provide a different indication on the indicator when clockwise or negative shaft rotations are measured than when counterclockwise or positive shaft rotations are measured, it is apparent that some means be provided to effectuate the tens transfer at a different position when negative rather than positive counts exist. Thus, for positive counts, the tens transfer must occur as the count passes from 9 to 0. As previously explained, this occurs when rotating contact 76 passes from fixed output contact 9 to fixed output contact 0. For negative shaft rotation, if the tens transfer is to occur as the count changes from 9 to 0, such transfer must be effectuated by rotating contact 76 passing from fixed output contact 1 to 0. In the device shown in Fig. 4, this is accomplished in the following manner. Since, for negative counts, minus relay R-13 is energized and plus relay R-12 is de-energized, make contact E-13 will be closed whereas make contact I-12 will be open, with the result that when relay R-0 is energized and make contacts E-0 and I-0 are both closed, rotating contact 71 rather than rotating contact 68 is energized. As previously explained, as the shaft 11 has rotated approximately ten revolutions, rotating contacts 68 and 71 will each engage adjacent fixed output contacts on the tens decade and therefore, when the circuit to rotating contact 71 is closed and the circuit to rotating contact 68 is open a tens transfer will occur. Thus, for minus counts, the tens transfer occurs as the rotating contact 76 passes from fixed output contact 1 to fixed output contact 0. As rotating contact 76 passes these fixed output contacts, it will simultaneously engage both. In order to prevent a double tens decade indication, which would result if both rotating contacts 68 and 71 were simultaneously energized, break contact G-0 is provided. As soon as rotating contact 76 engages fixed output contact 0, energizing relay R-0, break contact G-0 will open, opening the circuit to rotating contact 68 with the result that during the decade transfer rotating contacts 68 and 71 cannot both be energized at the same time.

The transfer in the hundreds decade is identical for positive and negative counts and therefore need not again be described.

As seen, the device illustrated in Fig. 4 has but a single zero output contact but can be used for both positive and negative counts. This factor is one of the important features of the invention and results in a device which is considerably more accurate than the various known types of mechanical digital counters. In such mechanical counters, in order to provide a tens transfer at the proper count, it is necessary to use a double zero count. Thus, it is necessary to effectuate the tens transfer between 9 and 0 but, in order to provide both positive and negative counts, and at the same time to effectuate the decade transfer at the same physical place in the mechanical counter, the different count identification for the positive and the negative counts requires the use of both a plus zero and a minus zero. The presence of such double zero results in an undesirable inaccuracy in that a count indication of zero will result from a shaft rotation of almost a full revolution in either the positive or the negative direction. A zero indication will therefore represent a shaft position which can vary over substantially two complete revolutions with the result that if a particular count be either commenced or ended with a zero count an inaccuracy as great as two revolutions can exist. In the present invention, however, no such double zero exists with the result that a zero count occurs for but one revolution and the possible error for counts commencing or ending with zero is but one-half as large as that present in the mechanical type counters.

In counting devices of the type herein described, it is frequently desirable to limit the maximum number of shaft revolutions which will register upon the indicator. Thus, it frequently occurs that data obtained by the measurement of the number of shaft revolutions becomes inaccurate and unreliable after a certain number of such revolutions has been exceeded. In the embodiment of the invention shown in Fig. 4, a circuit is provided to accomplish this result. As seen in Fig. 4, there is provided a break contact indicated as I-900 which is normally in the closed position. This contact is operated by relay R-900, being open when that relay is energized. When contact I-900 is open, plus relay R-12 is de-energized with the result that plus identification of the count is stopped and the indicator associated with the counting device no longer indicates the count. In a similar manner, a second break contact I-090 is provided to cause the counting device to become inoperative when a predetermined number of negative shaft revolutions has occurred. Break contact I-000 is operated by relay R-000, being opened when that relay is energized. When this contact is open, minus relay R-12 becomes deenergized with the result that negative identification of the count is stopped and the indicator associated with the counting device no longer indicates the count. In the example shown in Fig. 4, the maximum counts are plus and minus 900 shaft revolutions. It is, of course, apparent that these values may be varied and the device rendered inoperative after any number of desired shaft revolutions in either the positive or negative direction. This is accomplished by substituting the break contacts I-900 and I-000 with break contacts operated by the desired relays. Thus if it is desired to stop the count at, say 500 positive revolutions a break contact operated by relay R-500 is connected in the place of I-900. Similarly, if it is desired to stop the count at 200 negative revolutions, a break contact operated by relay R-700 (such relay being identified with a 200 count in the negative direction) is connected in the place of I-000.

Regardless of the type of indicating device used with the counter shown in Fig. 4, it is essential that either relay R-12 or R-13 be energized so as to determine whether a positive or a negative count is provided. As is apparent, however, in the circuit shown in Fig. 4, if the counter is started at 0 neither of these relays can be energized for the reason that neither the circuit to rotating contact 71 nor that to rotating contact 68 will be closed. Thus make contact E-13 will be open and similarly make contact I-12 will be open. The result will be that none of the relays in the tens decade will be energized. For this reason, none of the relays in the hundreds decade will be energized and no current can flow to the plus minus decade. This difficulty is overcome by the provision of a pair of starting bypass contacts G-12 and I-13. Both of these are break contacts, being normally closed. As previously described, break contact G-12 is designed to break after make contact I-12 makes in order to prevent a momentary opening of the circuit to rotating contact 68. Similarly, break contact I-13 is designed to break just after make contact E-13 makes in order to prevent a simultaneous momentary opening of the circuits to both rotating contacts 68 and 71 during a minus count. The break contacts G-12 and I-13 provide a closed circuit to rotating contacts 68 and 71 and therefore serve as a starting bypass. When either relay R-12 or R-13 is energized, one or the other of these break contacts is open so that during the operation of the counter they perform no function.

As previously described, a freezing circuit is provided in the counter shown in Fig. 4 whereby readings may be frozen and taken without disturbing the movement of the rotating parts or the operation of the counter. This is accomplished by the operator closing the switch 75 at the time a reading is desired. The closing of switch 75 energizes freeze relay R-11 which then closes the entire bank of make contacts indicated by the letter F with the appropriate subscript and opens the break contact 81. The count provided to the indicator will, under such conditions, remain unchanged. This count will be determined by the particular relays in the units, tens and hundreds decades which are energized and which in turn close the make contacts identified by the letter C with the appropriate subscript, associated therewith. Similarly, the appropriate plus or minus indication will be provided by the closing of either make contact C-12 or C-13. Due to the fact that break contact 81 is open, the circuits to each of the rotating contacts in each decade are open with the result that the indicated count cannot change. After the desired readings have been taken, switch 75 is open and the counter resumes its normal operation. In the embodiment of the invention illustrated in Figure 4, an interruption of the power and current to power bus 26 would cause the deenergization of all relays, and the interruption of the indicated count. However, upon the restoration of current and power to power bus 26, the position of the rotating contacts, 76, 68, 71, 92, 94, 104, and 106 would cause the correct relays to be energized, which in turn would produce the correct indicated count irrespective of the shaft rotation occurring during the current and power interruption.

The various electrical connections from power bus 26 to the relays which might otherwise cause erroneous counts are always kept open either by rotating contacts or by relay contacts with the result that electrical disturbances do not affect the count. Thus, unlike various electronic counters which have been proposed, common electrical disturbances will not cause spurious counts in counters embodying the above described invention.

It is to be understood that the forms of the invention herewith shown and described are to be taken as preferred examples of the same and that various modifications and changes may be resorted to without departing from the spirit of the invention or the scope of the appended claims.

We claim:

1. An electrical counter for digitally translating shaft rotations into electrical impulses including an input shaft, a second shaft geared thereto, a plurality of fixed output contacts, a pair of rotating contacts carried by the second mentioned shaft and adapted to successively engage the said fixed output contacts, a third shaft geared to the said second shaft, a second plurality of fixed output contacts, a second pair of rotating contacts carried by the said third shaft and adapted to successively engage the second plurality of fixed output contacts, a binary commutator on said input shaft and second shaft, a relay operated by each binary commutator to determine which of the pair of rotating contacts on the succeeding shaft is energized during transition of said rotating contacts from one fixed output contact to the next, relays operated through said output contacts, and a plurality of make and break contacts operated by the said relays according to the angular position of the said shafts whereby a digitized count in the form of electrical impulses representative of the angular position of the said input shaft is provided.

2. An electrical counter for digitally translating shaft rotations into electrical impulses including an input shaft, a second shaft geared thereto, a plurality of fixed output contacts, a pair of rotating contacts carried by the second mentioned shaft and adapted to successively engage the said fixed output contacts, a third shaft geared to the said second shaft, a second plurality of fixed output contacts, a second pair of rotating contacts carried by the said third shaft and adapted to successively engage the said second plurality of fixed output contacts, output circuits associated with each of said fixed output contacts for providing an electrical impulse representative of the angular position of the said input shaft, a binary commutator on said input and second shafts, relays operated by said binary commutator and connected to the pair of rotating contacts of said second shaft and third shaft respectively to determine which of the corresponding pair of rotating contacts is energized on transition of said contacts from one fixed output to the next whereby an electrical impulse is provided by but a single output circuit of each plurality of fixed output contacts at any angular position of the said shafts.

3. An electrical counter for digitally translating shaft rotations into electrical impulses including an input shaft, a second shaft geared thereto, a plurality of fixed output contacts, a pair of rotating contacts carried by the second mentioned shaft and adapted to successively engage the said fixed output contacts, a third shaft geared to the said second shaft, a second plurality of fixed output contacts, a second pair of rotating contacts carried by the said third shaft and adapted to successively engage the said second plurality of fixed output contacts, a fourth shaft geared to the said third shaft, a pair of fixed plus-minus contacts, an additional pair of rotating contacts carried by the said fourth shaft and adapted to successively engage the said fixed plus-minus contacts, relays and a plurality of make and break contacts operated by the said relays according to the angular position of the said shafts whereby a digitized count in the form of electrical impulses representative of the angular position of the said input shaft is provided, a binary commutator for each of said shafts and a selector relay for each binary commutator, said selector relays operatively connected with the pairs of rotating contacts of a succeeding shaft to determine which member of said pair of rotating contacts is energized during transition from one fixed output contact to the next.

4. An electrical counter for digitally translating shaft rotations into electrical impulses including an input shaft, a second shaft geared thereto, a plurality of fixed output contacts, a pair of rotating contacts carried by the second mentioned shaft and adapted to successively engage the said fixed output contacts, a third shaft geared to the said second shaft, a second plurality of fixed output contacts, a second pair of rotating contacts carried by the said third shaft and adapted to successively engage the said second plurality of fixed output contacts, a relay, binary commutator associated with said input shaft for energizing the said relay during a portion of each rotation of the said input shaft, a second relay, a second binary commutator associated with said second shaft for energizing the said second relay during a portion of each rotation of said second shaft, a third relay, a third binary commutator associated with said third shaft for energizing the said third relay during a portion of each rotation of the said third shaft, and a plurality of make and break contacts operated by the said relays to provide a digitized output count in the form of electrical impulses representative of the angular position of the said input shaft.

5. An electrical counter for digitally translating high speed shaft rotations into successive impulses, comprising: a series of driven shafts geared to said high speed shaft and operable at progressively decreasing speeds; a digital commutator surrounding each of said shafts; a binary commutator also surrounding each of said driven shafts as well as said high speed shaft; a pair of rotating contactors carried by each driven shaft for engagement with a corresponding digital commutator, each pair of contactors being spatially related to engage simultaneously a common commutator segment or succeeding segments but each contactor avoiding bridging between adjacent segments; a rotating contactor for each binary commutator; a relay for each binary commutator operatively connected with the pair of contactors of a succeeding digital commutator for alternative energizing of each of said pair of contactors; and relays connected with the segments of said decade commutators.

6. In an electrical counter for digitally translating rotations of a reversible high speed shaft into additive and subtractive impulses wherein said high speed shaft operates a series of driven shafts surrounded by digital commutators, of means for maintaining fidelity of impulse count irrespective of reversals of said high speed shaft, comprising: a binary commutator surrounding each of said driven shafts as well as said high speed shaft; a pair of rotating contactors carried by each driven shaft for engagement with a corresponding digital commutator, each pair of contactors being spatially related to engage simultaneously a common commutator segment or succeeding segments but each contactor avoiding bridging between adjacent segments; a rotating contactor for each binary commutator; a relay for each binary commutator operatively connected with the pair of contactors of a succeeding digital commutator for alternative energizing of each of said pair of contactors; and relays connected with the segments of said decade commutators.

KENNETH P. GOW.
ARTHUR L. KLEIN.

References Cited in the file of this patent

UNITED STATES PATENTS

| Number | Name | Date |
|---|---|---|
| 2,098,227 | Chauveau | Nov. 9, 1937 |
| 2,192,421 | Wallace | Mar. 5, 1940 |
| 2,207,743 | Larson et al. | July 16, 1940 |
| 2,216,069 | Doyle | Sept. 24, 1940 |
| 2,496,585 | Harper | Feb. 7, 1950 |
| 2,502,837 | Entz et al. | Apr. 4, 1950 |
| 2,568,348 | McCauley | Sept. 18, 1951 |
| 2,630,562 | Johnson | Mar. 3, 1953 |